(12) United States Patent
Rho et al.

(10) Patent No.: US 11,036,042 B2
(45) Date of Patent: Jun. 15, 2021

(54) CAMERA MODULE INCLUDING APERTURE

(71) Applicant: Samsung Electronics Co., Ltd., Suwon-si (KR)

(72) Inventors: Hyungjin Rho, Suwon-si (KR); Yeonhak Kim, Suwon-si (KR); Chanyoung Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/669,942

(22) Filed: Oct. 31, 2019

(65) Prior Publication Data

US 2020/0132979 A1      Apr. 30, 2020

(30) Foreign Application Priority Data

Oct. 31, 2018   (KR) .................. 10-2018-0131862

(51) Int. Cl.
*G02B 26/00* (2006.01)
*G02B 7/00* (2021.01)
(Continued)

(52) U.S. Cl.
CPC .......... *G02B 26/007* (2013.01); *G02B 7/006* (2013.01); *G02B 13/001* (2013.01); *H04N 5/2254* (2013.01)

(58) Field of Classification Search
CPC .... G02B 26/007; G02B 13/001; G02B 7/006; H04N 5/2254; G03B 9/04; G03B 2205/0069
(Continued)

(56) References Cited

U.S. PATENT DOCUMENTS 6,027,261 A    2/2000  Naganuma
7,156,564 B2 *  1/2007  Watanabe ................ G03B 9/08
                                                                396/463
(Continued)

FOREIGN PATENT DOCUMENTS

EP            3333628 A1   6/2018
KR   10-2016-0020768 A    2/2016
(Continued)

OTHER PUBLICATIONS

International Search Report dated Mar. 3, 2020, issued in an International Application No. PCT/KR2019/014592.
(Continued)

*Primary Examiner* — Pritham D Prabhakher
(74) *Attorney, Agent, or Firm* — Jefferson IP Law, LLP

(57) ABSTRACT

A camera module is provided. The camera module includes a housing, a lens assembly received in the housing and including at least one lens, an aperture including an aperture blade having an opening for adjusting an amount of external light incident on the at least one lens and a rotary shaft formed on a side of the aperture blade, in which the rotary shaft is coupled to the lens assembly such that the aperture blade is rotated about the rotary shaft, a magnet disposed on the aperture so as to be adjacent to the rotary shaft, at least one coil disposed on one surface of the housing so as to face the magnet, control circuitry that rotates the aperture using the coil, and a lens driving unit that moves the lens assembly in an optical axis direction of the lens.

20 Claims, 13 Drawing Sheets

(51) Int. Cl.
*G02B 13/00* (2006.01)
*H04N 5/225* (2006.01)

(58) Field of Classification Search
USPC ........................................................ 348/374
See application file for complete search history.

(56) References Cited

U.S. PATENT DOCUMENTS

| | | | |
|---|---|---|---|
| 8,743,194 B2 | 6/2014 | Fletcher et al. | |
| 8,786,695 B2 | 7/2014 | Fletcher et al. | |
| 9,307,134 B2 | 4/2016 | Ciurea et al. | |
| 9,495,751 B2 | 11/2016 | Wajs | |
| 9,807,312 B1 | 10/2017 | Kim et al. | |
| 9,857,549 B1 | 1/2018 | Shin et al. | |
| 10,237,458 B2* | 3/2019 | Lim | H04N 5/23245 |
| 10,506,146 B2* | 12/2019 | Seo | H04N 5/2257 |
| 10,645,262 B2* | 5/2020 | Oh | G02B 7/02 |
| 10,690,997 B2* | 6/2020 | Park | G03B 9/02 |
| 10,701,248 B2* | 6/2020 | Jeong | G02B 7/102 |
| 10,848,656 B2* | 11/2020 | Park | H04N 5/2253 |
| 10,893,178 B2* | 1/2021 | Park | H04N 5/2254 |
| 2010/0027094 A1 | 2/2010 | Ide | |
| 2011/0009163 A1 | 1/2011 | Fletcher et al. | |
| 2012/0242796 A1 | 9/2012 | Ciurea et al. | |
| 2013/0033578 A1 | 2/2013 | Wajs | |
| 2013/0033579 A1 | 2/2013 | Wajs | |
| 2013/0300919 A1 | 11/2013 | Fletcher et al. | |
| 2016/0042522 A1 | 2/2016 | Wajs et al. | |
| 2016/0054555 A1 | 2/2016 | Fletcher et al. | |
| 2016/0274441 A1 | 9/2016 | Yamamoto et al. | |
| 2016/0286199 A1 | 9/2016 | Wajs et al. | |
| 2017/0324892 A1 | 11/2017 | Kim et al. | |
| 2018/0069995 A1* | 3/2018 | Lim | G02B 5/20 |
| 2018/0164537 A1 | 6/2018 | Lee | |
| 2018/0284571 A1* | 10/2018 | Park | H04N 5/2252 |
| 2018/0343370 A1* | 11/2018 | Park | G03B 9/06 |
| 2018/0352133 A1* | 12/2018 | Yoneda | H02K 7/1023 |
| 2019/0020797 A1* | 1/2019 | Park | H04N 5/2254 |
| 2019/0049692 A1 | 2/2019 | Choi et al. | |

FOREIGN PATENT DOCUMENTS

| | | |
|---|---|---|
| KR | 10-1659395 B1 | 9/2016 |
| KR | 10-2017-0093056 A | 8/2017 |
| KR | 10-2018-0003935 A | 1/2018 |

OTHER PUBLICATIONS

Extended European Search Report dated Mar. 9, 2020, issued in a counterpart European Application No. 19206574.6-1010.

* cited by examiner

CAMERA MODULE INCLUDING APERTURE

CROSS-REFERENCE TO RELATED APPLICATION(S)

This application is based on and claims priority under 35 U.S.C. § 119 of a Korean patent application number 10-2018-0131862, filed on Oct. 31, 2018, in the Korean Intellectual Property Office, the disclosure of which is incorporated by reference herein in its entirety.

BACKGROUND

1. Field

The disclosure relates to a camera module. More particularly, the disclosure relates to a camera module including an aperture.

2. Description of Related Art

Various forms of portable electronic devices, such as a smartphone, a tablet personal computer (PC), and the like, have been widely used with the development of information technology (IT).

A camera module may be included in the electronic devices. The camera module may be made compact so as to be included in the electronic devices and may include various functions. For example, the camera module may include a zoom function to enlarge or reduce a subject at various magnifications. In another example, the camera module may include an auto focus (AF) function.

The above information is presented as background information only to assist with an understanding of the disclosure. No determination has been made, and no assertion is made, as to whether any of the above might be applicable as prior art with regard to the disclosure.

SUMMARY

The size and thickness of a portable electronic device in the related art may be restricted in view of portability, and the size and thickness of a camera module included in the portable electronic device may also be restricted. Aspects of the disclosure are to address at least the above-mentioned problems and/or disadvantages and to provide at least the advantages described below. Accordingly, an aspect of the disclosure is to provide a camera module of the portable electronic device in the related art has been manufactured by adopting a camera module that does not include some components, such as an aperture module.

Additional aspects will be set forth in part in the description which follows and, in part, will be apparent from the description, or may be learned by practice of the presented embodiments.

In accordance with an aspect of the disclosure, a camera module is provided. The camera module includes a housing, a lens assembly received in the housing and including at least one lens, an aperture including an aperture blade having an opening for adjusting an amount of external light incident on the at least one lens, and a rotary shaft formed on a side of the aperture blade, in which the rotary shaft is coupled to the lens assembly such that the aperture blade is rotatable about the rotary shaft, a magnet disposed on the aperture to be adjacent to the rotary shaft, at least one coil disposed on one surface of the housing so as to face the magnet, control circuitry that rotates the aperture using the coil, and a lens driving unit that moves the lens assembly in an optical axis direction of the lens.

In accordance with another aspect of the disclosure, a camera module is provided. The camera module includes a housing, a lens carrier including a lens barrel including one or more lenses therein, in which at least part of the lens carrier is disposed in the housing and the lens carrier is movable in an optical axis direction of the one or more lenses, an aperture module that adjusts an amount of light incident on the one or more lenses, and control circuitry that controls the aperture module. The aperture module includes a rotary member coupled to the lens carrier so as to be rotatable about a rotary shaft formed in the lens carrier, an aperture blade extending from the rotary member toward the lens barrel and having an opening aligned with an optical axis of the lenses, a first coil formed on a first surface of the housing, and a first magnet formed in the rotary member and disposed adjacent to the first coil. The control circuitry controls the first coil to rotate the rotary member and the aperture blade about the rotary shaft.

In accordance with another aspect of the disclosure, an electronic device is provided. The electronic device includes a camera module, a memory, and at least one processor electrically connected with the memory and the camera module, in which the camera module includes a housing, a lens carrier including one or more lenses therein, in which at least part of the lens carrier is disposed in the housing and the lens carrier is movable in an optical axis direction of the one or more lenses, a rotary member coupled to the lens carrier so as to be rotatable about a rotary shaft formed in the lens carrier, an aperture blade extending from the rotary member toward the lenses and having an opening aligned with an optical axis of the lenses, a first coil formed on a first surface of the housing, and a first magnet formed in the rotary member and disposed adjacent to the first coil. The at least one processor is configured to activate the camera module in response to a request associated with taking an image, and drive the aperture blade of the camera module according to aperture settings associated with taking the image.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
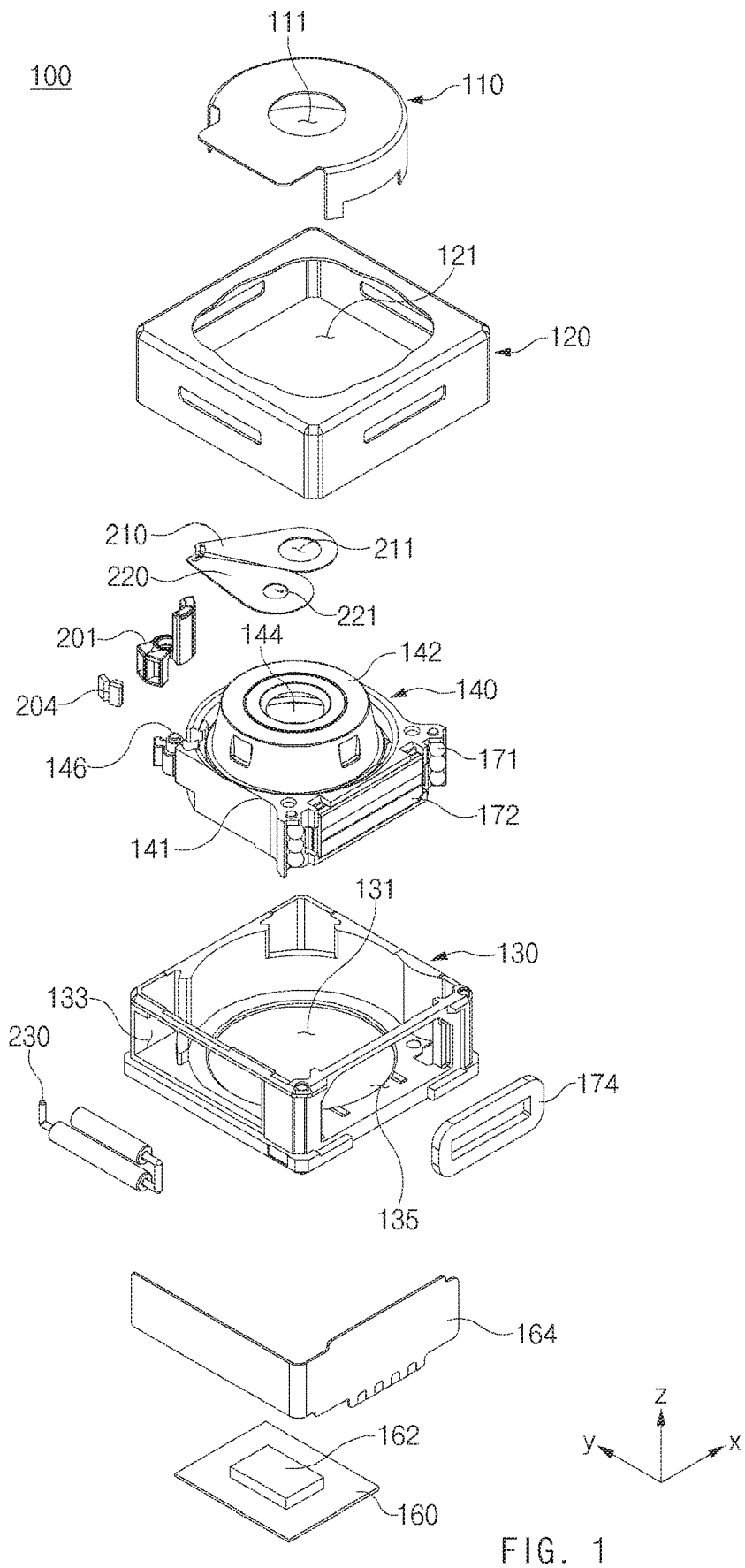
FIG. 1 is an exploded perspective view of a camera module according to an embodiment of the disclosure.

FIG. 1 is an exploded perspective view of a camera module 100 (e.g., a camera module 1280 of FIG. 12) according to an embodiment of the disclosure.

In an embodiment, the camera module 100 may include a housing, a lens carrier 140 disposed in the housing, an aperture module 200 for adjusting the amount of light incident on a lens 144, a focus module 170 for focusing the lens 144 by driving the lens 144 along an optical axis, and a substrate 160.

Referring to FIG. 1, the optical axis direction of the lens 144 mentioned herein may mean the direction in which the optical axis of the lens 144 disposed in a lens barrel 142 extends, and may refer to both the +Z-axis direction and the −Z-axis direction.

In an embodiment, the housing may include an upper housing 120, a lower housing 130 combined with the upper housing 120 and having the lens carrier 140 disposed therein, and a cover 110 combined with the upper housing 120. As shown in FIG. 1, the cover 110 may include a recessed portion 111.

In an embodiment, the upper housing 120 may have an opening 121 through which at least part of the lens carrier 140 is exposed in the optical axis direction of the lens 144. In the illustrated embodiment, at least part of the lens barrel 142 may be exposed through the opening 121.

In some embodiments, the camera module 100 (e.g., the camera module 1280 of FIG. 12) may include a lens assembly (e.g., including the lens barrel 142 and the lens 144 of FIG. 1, or a lens assembly 1310 of FIG. 13) that is coupled to the lens carrier 140 and that moves together with the lens carrier 140 in the optical axis direction of the lens 144 (e.g., in the Z-axis direction).

In an embodiment, the lower housing 130 may have the lens carrier 140 disposed therein. Furthermore, the lower housing 130 may have a first coil 230 and a second coil 174 disposed therein. The first coil 230 may drive the aperture module 200 facing the vertical direction, and the second coil 174 may drive the lens carrier 140 in the optical axis direction of the lens 144.

In the illustrated embodiment, the first coil 230 and the second coil 174 may be disposed in a second opening 133 and a third opening 135 formed in the lower housing 130, respectively.

The lower housing 130 may include side surfaces that face perpendicular directions to the optical axis direction of the lens 144. The first coil 230 may be disposed on one of the side surfaces, and the second coil 174 may be disposed on another one of the side surfaces. In the illustrated embodiment, the side surface on which the first coil 230 is disposed and the side surface on which the second coil 174 is disposed may be connected with each other. However, without being limited thereto, the side surface on which the first coil 230 is disposed and the side surface on which the second coil 174 is disposed may be formed to face each other.

In the illustrated embodiment, the camera module 100 (e.g., the camera module 1280 of FIG. 12) may further include a flexible printed circuit board 164 that connects the first coil 230, the second coil 174, and the substrate 160. The flexible printed circuit board 164 may cover at least some of the side surfaces of the lower housing 130. Alternatively, the flexible printed circuit board 164 may cover the side surface on which the first coil 230 is formed and the side surface on which the second coil 174 is formed, among the side surfaces of the lower housing 130.

In an embodiment, the lower housing 130 may be open at one side (e.g., in the +Z-axis direction) such that the lens carrier 140 is inserted into the lower housing 130 and at least part of the lens carrier 140 is exposed through the open one side of the lower housing 130. The substrate 160 including an image sensor 162 (e.g., an image sensor 1330 of FIG. 13) may be disposed under the lower housing 130, and a first opening 131 may be formed in a surface of the lower housing 130 that faces the image sensor 162. Light passing through the lens 144 may be incident on the image sensor 162 through the first opening 131.

In some embodiments, the housing may include a first surface and a second surface that face the optical axis direction of the lens 144 and a third surface that surrounds a space between the first surface and the second surface. The third surface may face a direction substantially perpendicular to the optical axis direction of the lens 144. A first opening (e.g., the opening 121 of the upper housing 120) into which at least part of the lens barrel 142 included in the lens carrier 140 is inserted may be formed in the first surface, and a second opening (e.g., the first opening 131 of the lower housing 130) through which light passing through the lens barrel 142 passes may be formed in the second surface. The substrate 160 including the image sensor 162 may be disposed under the second opening. The first surface may be formed by the cover 110 and the upper housing 120 illustrated in FIG. 1, and the second surface and the third surface may be formed by the lower housing 130 illustrated in FIG. 1.

In an embodiment, the lens carrier 140 may have a module of the lens 144 disposed therein and may be disposed in the housing so as to be movable in the optical axis direction of the lens 144. In the illustrated embodiment, part of the lens carrier 140 may be inserted into the opening 121 formed in the upper housing 120. The lens barrel 142 may contain one or more lenses 144. The lens barrel 142 may be exposed outside the housing through the opening 121 formed in the upper housing 120, and therefore external light may be incident on the one or more lenses 144 contained in the lens barrel 142.

In an embodiment, the lens carrier 140 may include a first surface facing the optical axis direction of the lens 144 and a side surface perpendicular to the optical axis direction of the lens 144. A second magnet 172 and a rolling member that are relevant to the focus module 170 may be disposed on a partial area of the side surface of the lens carrier 140. In an embodiment, the lens barrel 142 may be disposed on a central portion of the first surface of the lens carrier 140. Meanwhile, a protruding boss 146 relevant to the aperture module 200 may be formed near the lens barrel 142, and a rotary member 201 of the aperture module 200 may be rotatably coupled to the protruding boss 146.

In an embodiment, the camera module 100 (e.g., the camera module 1280 of FIG. 12) may include the aperture module 200. The aperture module 200 may adjust the amount of light incident on the lens 144 disposed in the lens barrel 142. In an embodiment, the aperture module 200 may include the rotary member 201 rotatably coupled to one side of the lens carrier 140, aperture blades 210 and 220 extending from the rotary member 201 to the optical axis of the lens 144 and having openings 211 and 221 through which light incident on the lens 144 passes, a magnet 204 formed in the rotary member 201, and the first coil 230 magnetically connected with the magnet 204 and disposed on a partial area of the side surfaces of the lower housing 130.

In an embodiment, the camera module 100 (e.g., the camera module 1280 of FIG. 12) may include the focus module 170. The focus module 170 may include the second magnet 172 formed on one surface of the lens carrier 140, the rolling member (e.g., a ball 171) disposed on one surface of the lens carrier 140, and the second coil 174 formed on a partial area of the side surfaces of the lower housing 130.

In an embodiment, the camera module 100 (e.g., the camera module 1280 of FIG. 12) may be configured such that the lens carrier 140 is driven in the optical axis direction of the lens 144 (e.g., in the +Z-axis direction or the −Z-axis direction) by the focus module 170 and the aperture blades 210 and 220 are rotatably coupled to the lens carrier 140. Accordingly, even when the lens carrier 140 is driven in the optical axis direction of the lens 144, the aperture blades 210 and 220 may adjust the amount of light incident on the lens 144 while maintaining a predetermined gap from the lens 144 (e.g., a predetermined gap in the optical axis direction of the lens 144).

Figure 2:
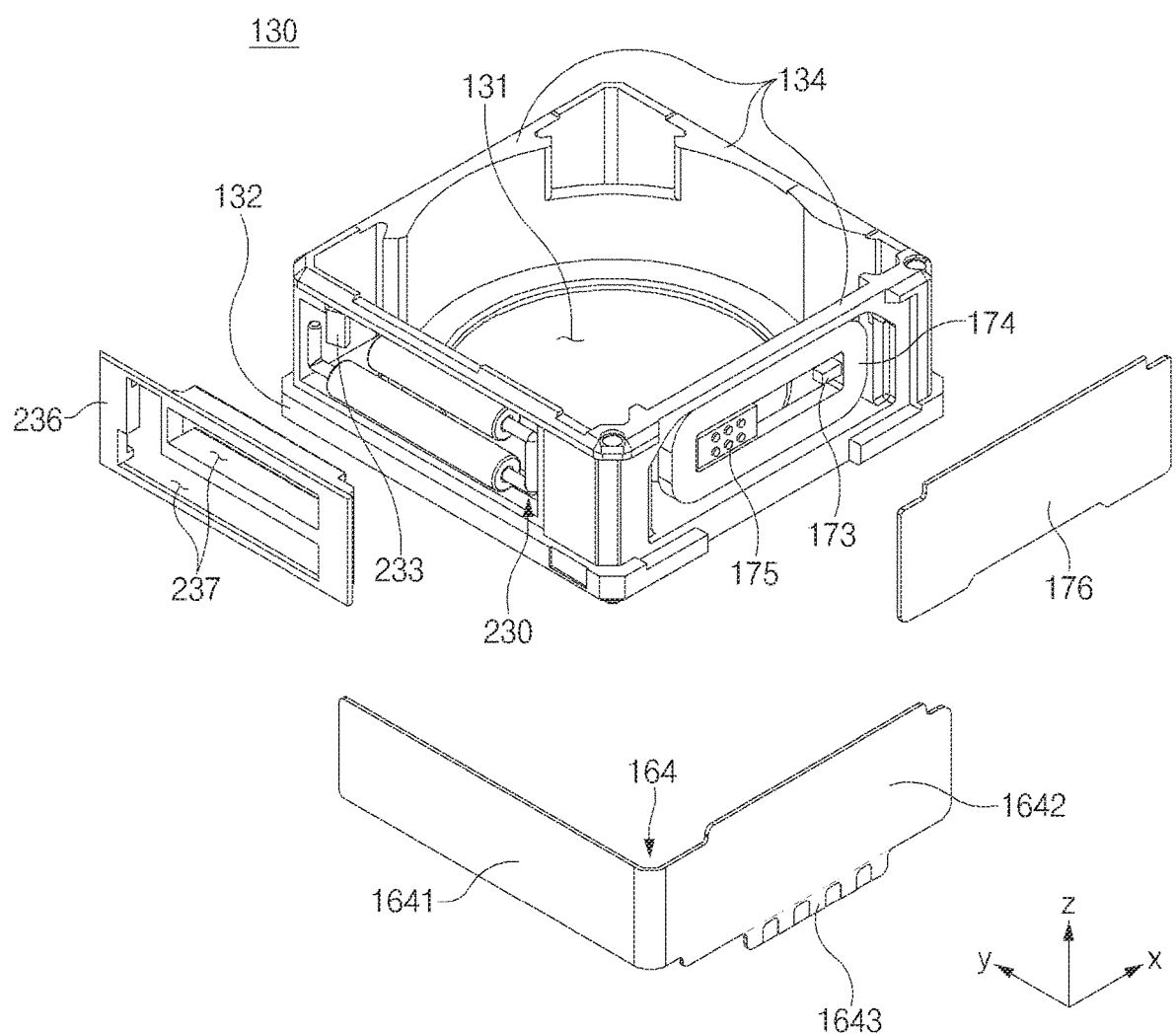
FIG. 2 is a view illustrating a lower housing of the camera module according to an embodiment of the disclosure.

FIG. 2 is a view illustrating the lower housing of the camera module according to an embodiment of the disclosure.

Referring to FIG. 2, the lower housing 130 may be formed of a housing that is open in one direction (e.g., the +Z-axis direction) along the optical axis of the lens 144. The opening 131 may be formed in a surface that faces an opposite direction (e.g., the −Z-axis direction) along the optical axis of the lens 144. The lower housing 130 may have a lens carrier disposed therein (e.g., the lens carrier 140 of FIG. 2).

In the illustrated embodiment, the lower housing 130 may include the side surfaces that face perpendicular directions to the optical axis direction of the lens 144. In the illustrated embodiment, the first coil 230 and first control circuitry 233 may be disposed on one area of the side surfaces, and the second coil 174, a sensor 173, and second control circuitry 175 may be disposed on another area of the side surfaces. The side surfaces of the lower housing 130 may include a first area in which the first coil 230 and the first control circuitry 233 are disposed and a second area in which the second coil 174 and the second control circuitry 175 are disposed. The first coil 230 and the first control circuitry 233 may be associated with driving the aperture module 200 described above, and the second coil 174, the sensor 173, and the second control circuitry 175 may be associated with driving the focus module 170 described above.

In some embodiments, the lower housing 130 may include a base 132 facing the optical axis direction of the lens 144 and a sidewall 134 formed on the base 132. The base 132 may have the opening 131 through which light passing through the lens 144 passes. The sidewall 134 may be formed to surround the lens carrier 140 disposed on the base 132. The sidewall 134 may include the first area in which the first coil 230 and the first control circuitry 233 are disposed and the second area in which the second coil 174 and the second control circuitry 175 are disposed.

Referring to FIG. 2, openings may be formed through the first and second areas of the sidewall 134. The first coil 230 and the first control circuitry 233 may be disposed in the opening formed in the first area. The first coil 230 and the first control circuitry 233 may be fixed to the sidewall 134 of the lower housing 130 by a mold member 236 inserted into the opening. The second coil 174, the second control circuitry 175, and the sensor 173 may be disposed in the opening formed in the second area. The second coil 174, the second control circuitry 175, and the sensor 173 may be fixed to the sidewall 134 of the lower housing 130 by a plate 176 inserted into the opening.

In the illustrated embodiment, the flexible printed circuit board 164 may include a first area 1641, a second area 1642, and a third area 1643. The first area 1641 may be disposed on a partial area of the sidewall 134 on which the first coil 230 is disposed and may be electrically connected with the first coil 230. The second area 1642 may be disposed on a partial area of the sidewall 134 on which the second coil 174 is disposed and may be electrically connected with the second coil 174. The third area 1643 may be connected with a substrate (e.g., the substrate 160 of FIG. 1).

Figure 3:
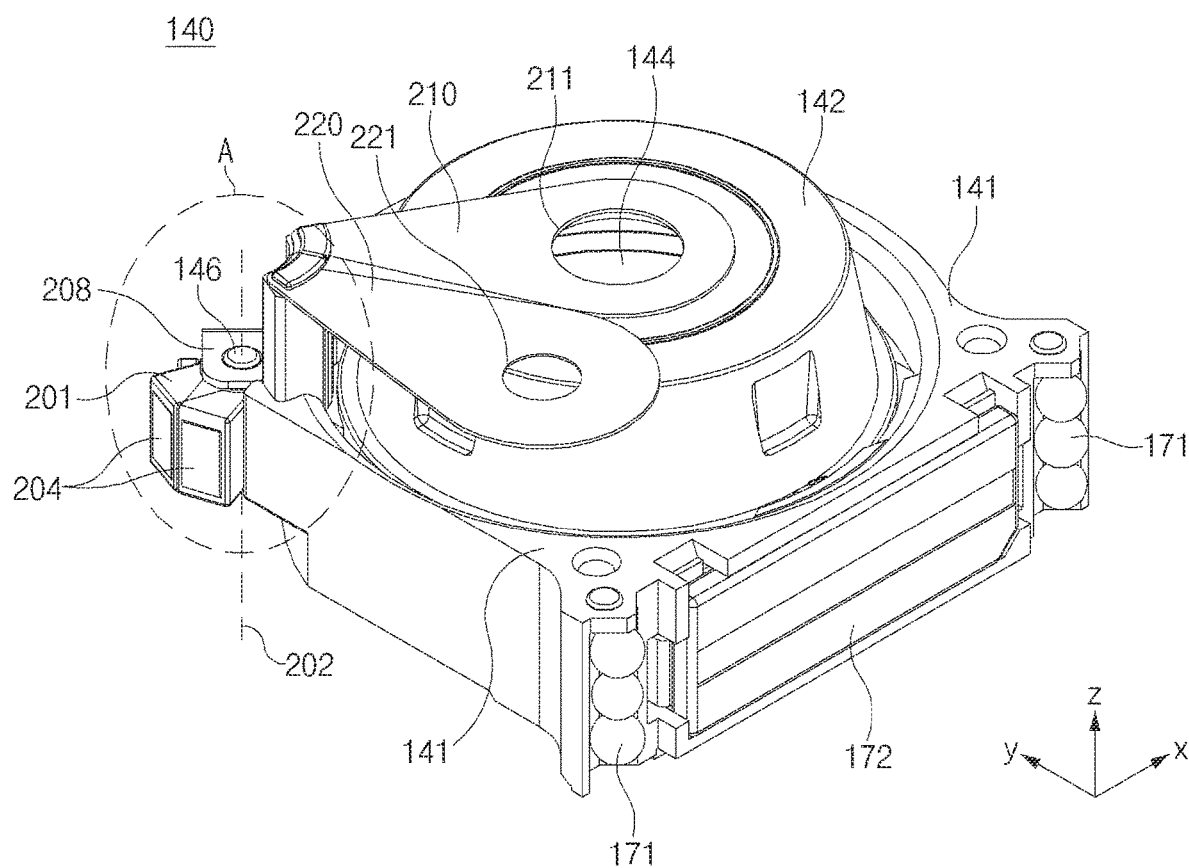
FIG. 3 is a view illustrating a lens carrier and an aperture module of the camera module according to an embodiment of the disclosure.

FIG. 3 is a view illustrating the lens carrier 140 and the aperture module 200 of the camera module 100 according to an embodiment of the disclosure.

Referring to FIG. 3, the lens carrier 140 may include the lens barrel 142 containing the one or more lenses 144 and a body 141 surrounding the lens barrel 142. At least part of the lens barrel 142 may be disposed in the body 141, and the rest of the lens barrel 142 may protrude from one surface (e.g., a surface facing the +Z-axis direction) of the body 141.

In the illustrated embodiment, the lens barrel 142 may be disposed in a central portion of the body 141, and part of the aperture module 200 may be disposed in a peripheral portion of the body 141. The protruding boss 146 may be formed on the peripheral portion of the body 141. The protruding boss 146 may protrude from the body 141 in the one direction (e.g., the +Z-axis direction) along the optical axis of the lens 144.

In an embodiment, the aperture module 200 may include the rotary member 201, the first magnet 204 coupled to the rotary member 201, the aperture blades 210 and 220 extending from the rotary member 201 toward the lens barrel 142, and the openings 211 and 221 formed in the aperture blades 210 and 220. The rotary member 201 may rotate about a rotary shaft 202 illustrated in FIG. 3. The rotary member 201 may be rotatably coupled to the protruding boss 146 formed on the peripheral portion of the body 141 of the lens carrier 140, and therefore the rotary shaft 202 of the aperture module 200 may be formed. The rotary shaft 202 may be formed substantially parallel to the optical axis direction of the lens 144.

Referring to FIG. 3, the rotary member 201 of the aperture module 200 may include the first magnet 204 disposed in a first radial direction with respect to the rotary shaft 202. The aperture blades 210 and 220 extending in a second radial direction with respect to the rotary shaft 202 may be connected to the rotary member 201 of the aperture module 200. The first radial direction and the second radial direction may be different directions, and the first magnet 204 and the aperture blades 210 and 220 may be spaced apart from each other by a predetermined angle with respect to the rotary shaft 202.

In an embodiment, the aperture blades 210 and 220 may include the first aperture blade 210 having the first opening 211 formed therein and the second aperture blade 220 having the second opening 221 formed therein. The first opening 211 may be formed to be larger than the second opening 221, and the amount of light incident on the lens 144 may be increased with an increase in the sizes of the openings 211 and 221.

In an embodiment, the first aperture blade 210 and the second aperture blade 220 may rotate about the same rotary shaft 202 formed by the protruding boss 146. The first aperture blade 210 and the second aperture blade 220 may extend from the rotary member 201 in a radial direction with respect to the rotary shaft 202. Although the first aperture blade 210 and the second aperture blade 220 are configured to rotate about the same rotary shaft 202, the first aperture blade 210 and the second aperture blade 220 may or may not cover the lens 144 depending on the rotation angle of the rotary member 201. When the aperture blade 210 or 220 covers the lens 144, this may mean that the center of the opening 211 or 221 formed in the aperture blade 210 or 220 is located on the optical axis of the lens 144.

In an embodiment, a first distance between the first opening 211 of the first aperture blade 210 and the rotary shaft 202 (e.g., a radius of rotation about the rotary shaft 202) may be the same as a second distance between the second opening 221 of the second aperture blade 220 and the rotary shaft 202 (e.g., a radius of rotation about the rotary shaft 202). The first distance and the second distance may be the same as a third distance from the rotary shaft 202 to the optical axis of the lens 144. Accordingly, the center of the opening 211 or 221 formed in the aperture blade 210 or 220 may be accurately located on the optical axis of the lens 144 when the aperture blade 210 or 220 covers the lens 144 depending on the rotation angle of the rotary member 201.

In the illustrated embodiment, the aperture module 200 may further include a fixing bracket 208 coupled to the protruding boss 146 formed on the body 141 of the lens carrier 140. The fixing bracket 208 may securely couple the rotary member 201 to the protruding boss 146.

In some embodiment, the lens carrier 140 may include a first surface in which an opening is formed and a second surface that is connected with the first surface and on which the second magnet 172 is disposed. The first surface may be a surface facing the optical axis direction of the lens 144, and the second surface may be a surface formed to be substantially perpendicular to the first surface. The lens barrel 142 may be inserted into the opening of the first surface in the optical axis direction of the lens 144. The opening may be formed in a central portion of the first surface, and the protruding boss 146 to which the rotary member 201 of the aperture module 200 is rotatably coupled may be formed near the opening.

In the illustrated embodiment, the second magnet 172 and the rolling member (e.g., the ball 171) that are relevant to the focus module 170 may be disposed on a partial area of the side surface of the lens carrier 140.

In some embodiments, the lens barrel 142 may include a fixed opening aligned with the optical axis of the lens 144 disposed in the lens barrel 142. Light may be incident on the lens 144 in the lens barrel 142 through the fixed opening. The camera module 100 may include one or more aperture blades (e.g., the aperture blade 210 or 220) that have the opening 211 or 221 formed to be smaller than the fixed opening.

Figure 4:
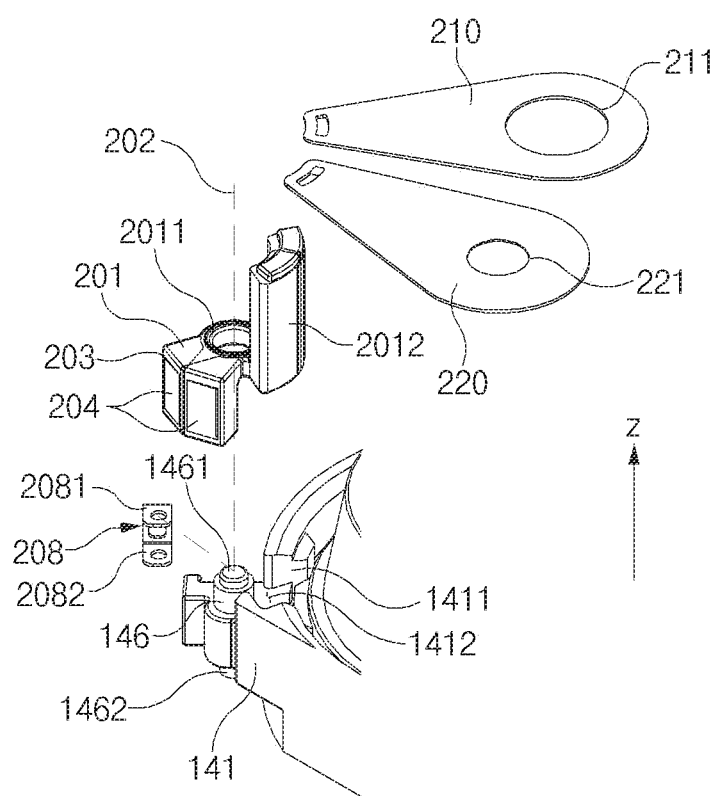
FIG. 4 is an exploded perspective view of the aperture module of the camera module according to an embodiment of the disclosure.

FIG. 4 is an exploded perspective view of the aperture module 200 of the camera module 100 according to an embodiment of the disclosure.

Referring to FIG. 4, the aperture module 200 may include the rotary member 201, the first magnet 204 disposed in the rotary member 201, the first aperture blade 210 and the second aperture blade 220 that are connected to the rotary member 201, and the fixing bracket 208 for fixing the rotary member 201 to the protruding boss 146.

In an embodiment, the rotary member 201 may include a magnet recess 203 formed in the first radial direction with respect to the rotary shaft 202. The first magnet 204 may be inserted into the magnet recess 203. The rotary member 201 may include an extension 2012 formed in the second radial direction with respect to the rotary shaft 202 and extending in the optical axis direction of the lens 144 (e.g., in the +Z-axis direction). The extension 2012, as will be described herein, may extend to a higher position than an upper surface (an end surface facing the +Z-axis direction) of the lens 144 disposed in the lens barrel 142. The aperture blades 210 and 220 may be connected to the extension 2012. The aperture blades 210 and 220 may extend toward the central portion of the body 141 from an end portion of the extension 2012 that faces the optical axis direction (an end portion facing the +Z-axis direction) to cover the lens 144 contained in the lens barrel 142.

In the illustrated embodiment, the rotary member 201 may include a fastening portion 2011 that includes an opening having a size corresponding to the protruding boss 146. The protruding boss 146 may be inserted into the opening, and therefore the rotary member 201 may be coupled to the protruding boss 146 so as to be rotatable about the protruding boss 146.

In the illustrated embodiment, it is exemplified that the protruding boss 146 protrudes in the +Z-axis direction. However, without being limited thereto, the protruding boss 146 may protrude in the −Z-axis direction, or may protrude in the opposite directions along the optical axis of the lens 144.

The fixing bracket 208 may be bent in the shape of "c". The fixing bracket 208 may be formed to press the fastening portion 2011 of the rotary member 201 coupled to the protruding boss 146.

In the illustrated embodiment, the body 141 of the lens carrier 140 may further include a first additional protrusion 1461 and a second additional protrusion 1462 that further protrude from the protruding boss 146 in the optical axis direction of the lens 144. The first additional protrusion 1461 may further protrude beyond the opening of the fastening portion 2011 of the rotary member 201 in the optical axis direction of the lens 144. The fixing bracket 208 may be mounted on the additional protrusions 1461 and 1462.

Referring to FIG. 4, the fixing bracket 208 may include a first portion 2081 coupled to the first additional protrusion 1461 and a second portion 2082 coupled to the second additional protrusion 1462. The first portion 2081 and the second portion 2082 may each have an opening into which the protruding boss 146 is inserted. The openings may have a size substantially corresponding to the additional protrusions 1461 and 1462. The openings may be formed to be substantially smaller than the opening formed in the fastening portion 2011 of the rotary member 201.

In an embodiment, the first aperture blade 210 and the second aperture blade 220 may be connected to the extension 2012 of the rotary member 201. The first aperture blade 210 and the second aperture blade 220 may be connected to the extension 2012 in different radial directions. The first opening 211 may be formed in the first aperture blade 210, and the second opening 221 smaller than the first opening 211 may be formed in the second aperture blade 220.

In an embodiment, the body 141 of the lens carrier 140 may include the protruding boss 146 that is formed on an outer surface of the body 141 and that protrudes in the optical axis direction of the lens 144 and a rotation groove 1412 that is formed in a portion adjacent to the protruding boss 146 and in which at least part of the rotary member 201 is disposed.

The extension 2012 of the rotary member 201 may be disposed in the rotation groove 1412. The rotation groove 1412 may be formed to have an angle that corresponds to an angle by which the extension 2012 is rotated as the rotary member 201 rotates about the rotary shaft 202. A sidewall 1411 of the rotation groove 1412 may function as a stopper that restricts the rotation angle of the rotary member 201. For example, a maximum rotation angle may be determined by the sidewall 1411 when the rotary member 201 rotates about the rotary shaft 202 in the counterclockwise direction.

Figure 5:
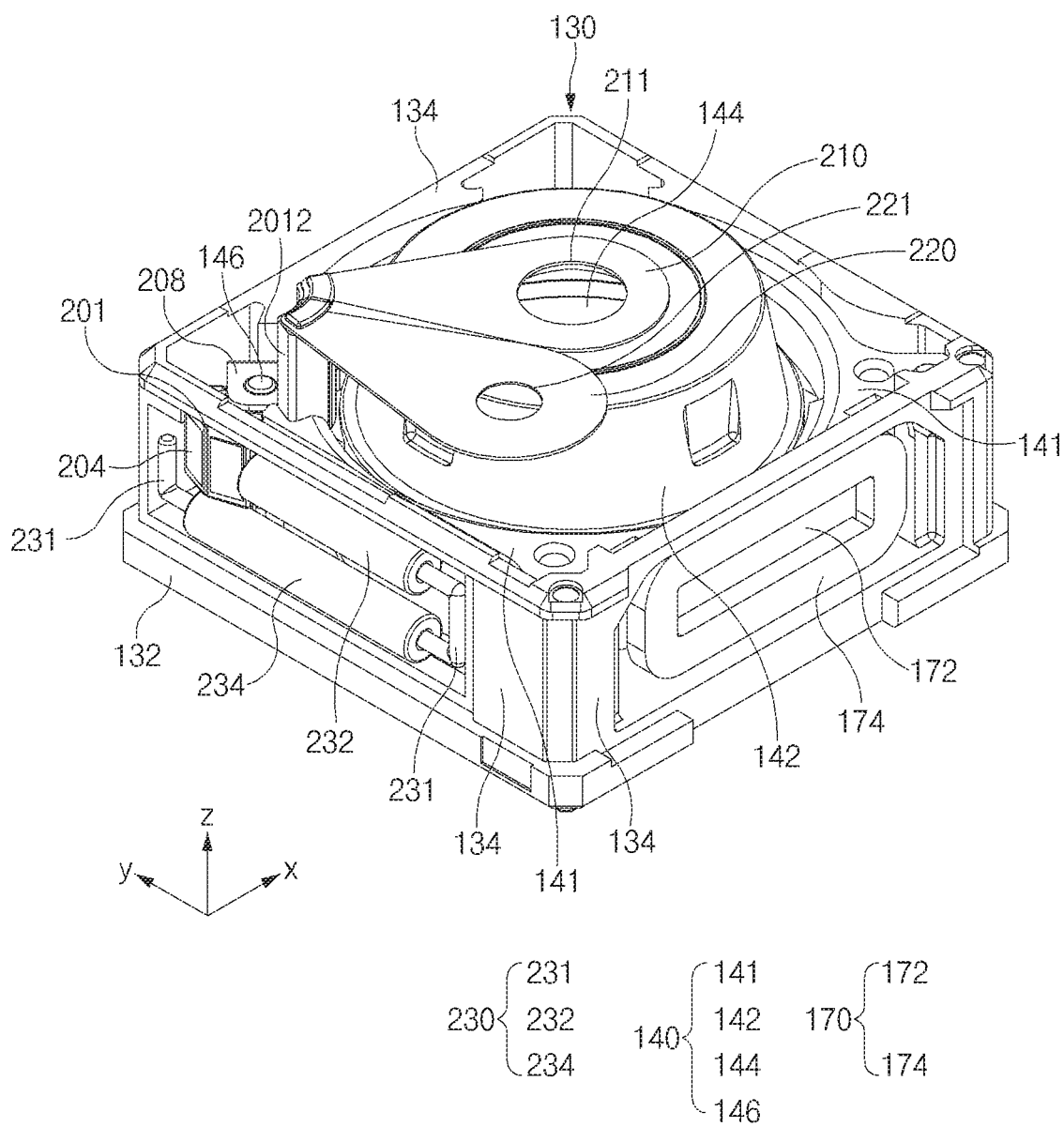
FIG. 5 is a view illustrating a coupling relationship between the lens carrier, the aperture module, and the lower housing of the camera module according to an embodiment of the disclosure.

FIG. 5 is a view illustrating a coupling relationship between the lens carrier 140, the aperture module 200, and the lower housing 130 of the camera module 100 according to an embodiment of the disclosure.

Referring to FIG. 5, the lower housing 130 may include the base 132 on which the lens carrier 140 is mounted and the sidewall 134 surrounding the lens carrier 140. The sidewall 134 may be formed in a rectangular shape having substantially four surfaces. The first coil 230 relevant to operation of the aperture module 200 may be disposed on one of the surfaces that form the sidewall 134. The second coil 174 relevant to operation of the focus module 170 may be disposed on another one of the surfaces that form the sidewall 134.

In an embodiment, at least part of the lens carrier 140 may be received in the lower housing 130. The lens carrier 140 may be disposed in a space that is formed by the sidewall 134 and the base 132 of the lower housing 130 and that is open at one side (e.g., in the +Z-axis direction).

In an embodiment, the lens carrier 140 may be disposed in the inner space, which is formed by the sidewall 134 of the lower housing 130, such that the rotary member 201 of the aperture module 200 disposed on a partial area of the outer surface of the lens carrier 140 is adjacent to the first coil 230 included in the lower housing 130. The lens carrier 140 may be disposed in the inner space, which is formed by the sidewall 134 of the lower housing 130, such that the second magnet 172 disposed on a partial area of the outer surface of the lens carrier 140 is adjacent to a second driving unit included in the lower housing 130.

That is, the lens carrier 140 and the lower housing 130 may be combined together such that the first coil 230, together with the first magnet 204, rotates the aperture blades 210 and 220, and the second coil 174, together with the second magnet 172, linearly drives the lens carrier 140 (e.g., in the optical axis direction of the lens 144, the +Z-axis direction, or the −Z-axis direction). The first coil 230 and the first magnet 204 may magnetically interact with each other, and therefore the aperture blades 210 and 220 may be driven even when the lens carrier 140 is linearly moved. Furthermore, the aperture blades 210 and 220 may be coupled to the lens carrier 140 and linearly moved together with the lens carrier 140, and therefore the gap between the lens 144 and the openings 211 and 221 formed in the aperture blades 210 and 220 may remain constant. Accordingly, the amount of light incident on the lens 144 is able to be adjusted irrespective of the displacement of the lens carrier 140 in the optical axis direction.

In the illustrated embodiment, the lens barrel 142 may be formed to be higher than the sidewall 134 of the lower housing 130 in the optical axis direction of the lens 144 (e.g., in the +Z-axis direction). Likewise, the extension 2012 of the rotary member 201 rotatably coupled to the body 141 may extend outward beyond the sidewall 134 in the optical axis direction of the lens 144, and the aperture blades 210 and 220 connected to the extension 2012 may be disposed in a higher position than the sidewall 134 in the optical axis direction of the lens 144.

Figure 6:
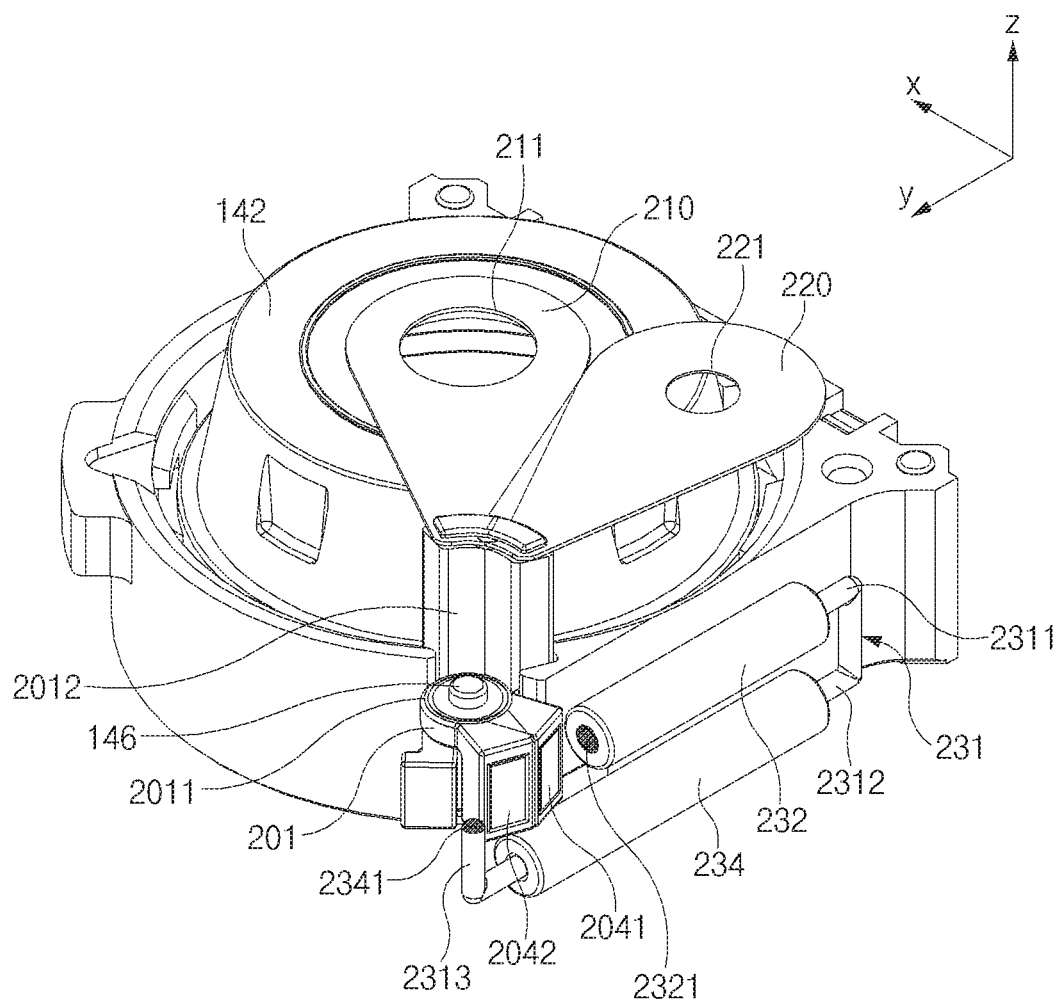
FIG. 6 is a view illustrating the lens carrier and a first coil of the camera module according to an embodiment of the disclosure.

FIG. 6 is a view illustrating the lens carrier 140 and the first coil 230 of the camera module 100 according to an embodiment of the disclosure.

Figure 7:
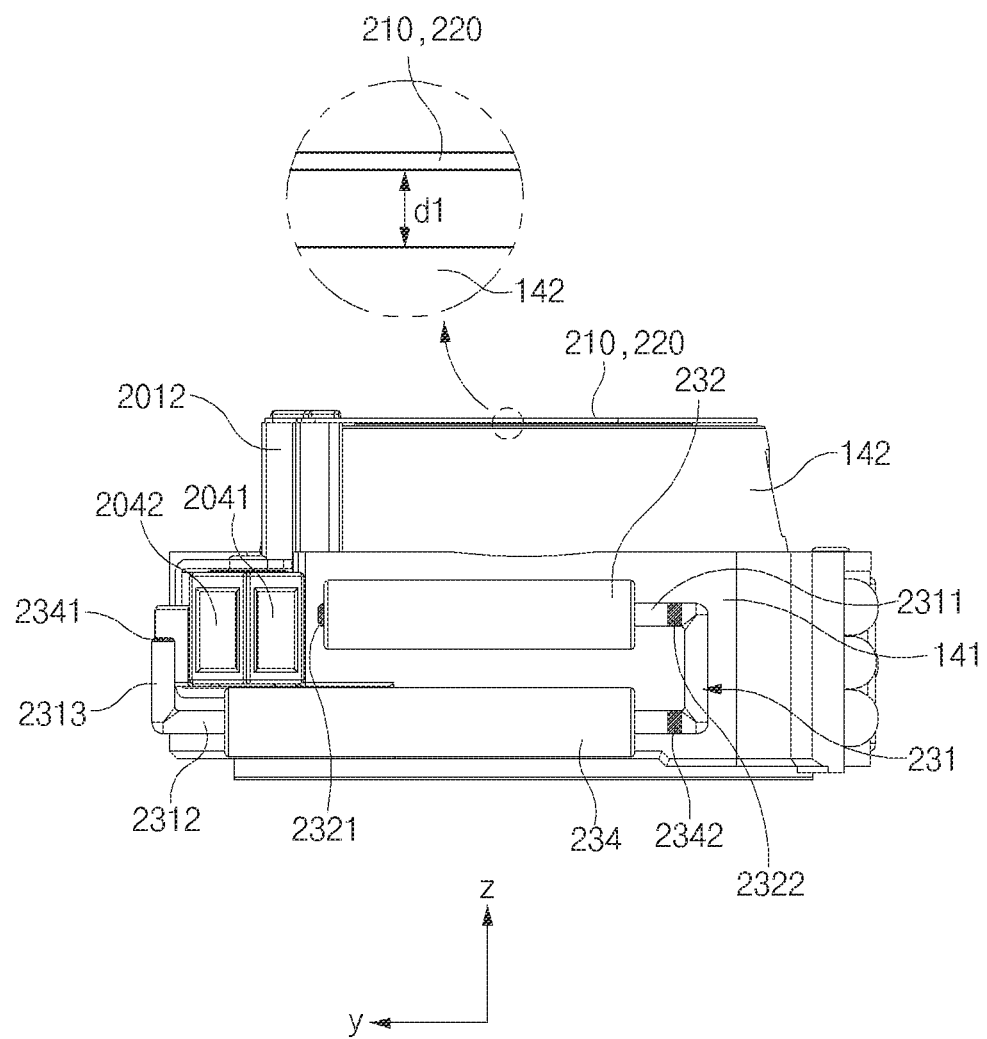
FIG. 7 is a view illustrating an arrangement relationship between a rotary member and the first coil in the camera module according to an embodiment of the disclosure.

FIG. 7 is a view illustrating an arrangement relationship between the rotary member 201 and the first coil 230 in the camera module 100 according to an embodiment of the disclosure.

Referring to FIGS. 6 and 7, the aperture module 200 may include the first coil 230, the rotary member 201, the first magnet 204 disposed in the rotary member 201, and the aperture blades 210 and 220 for covering the lens 144.

In the illustrated embodiment, the first coil 230 may include a conductor 231 spaced apart from the outer surface of the body 141 of the lens carrier 140 by a predetermined gap, the first coil 230 wound around the conductor 231, and the first control circuitry 233 that controls the supply of power to the first coil 230.

In an embodiment, the first coil 230 may include coil 1-1 230 and coil 1-2 234. Coil 1-1 232 may be disposed on a side of coil 1-2 234 in the optical axis direction of the lens 144.

Coil 1-1 232 and coil 1-2 234 may be formed in a direction perpendicular to the optical axis direction of the lens 144. Accordingly, coil 1-1 232 and coil 1-2 234 may generate a magnetic field in the +Y-axis direction or the −Y-axis direction depending on the direction of current.

In an embodiment, the conductor 231 may include a first portion 2311 around which coil 1-1 232 is wound and that is adjacent to one side of the first magnet 204, a second portion 2312 around which coil 1-2 234 is wound, and a third portion 2313 that is connected with the second portion 2312 and that is adjacent to an opposite side of the first magnet 204. The first portion 2311 and the second portion 2312 may be connected and integrated with each other, or may be implemented as separate from each other. The first portion 2311 of the conductor 231 may extend in a direction (e.g., the Y-axis direction) perpendicular to the optical axis direction of the lens 144, and coil 1-1 232 wound around the first portion 2311 may extend in the direction (e.g., the Y-axis direction) perpendicular to the optical axis direction. The second portion 2312 of the conductor 231 may extend in the direction perpendicular to the optical axis direction of the lens 144, and coil 1-2 234 wound around the second portion 2312 may extend in the direction (e.g., the Y-axis direction) perpendicular to the optical axis direction. The third portion 2313 may extend from an end of the second portion 2312 in the optical axis direction of the lens 144.

In an embodiment, the first portion 2311 of the conductor 231 may include a first end 2321 (e.g., an end facing the +Y-axis direction) that is located adjacent to the first magnet 204 and a second end 2322 (e.g., an end facing the −Y-axis direction) that is located a relatively long distance away from the first magnet 204. Coil 1-1 232 may be formed between the first end 2321 and the second end 2322. Depending on the direction of current flowing through coil 1-1 232, an N-pole and an S-pole may be formed at the first end 2321 and the second end 2322, or vice versa.

In an embodiment, the third portion 2313 of the conductor 231 may include a third end 2341 located adjacent to the first magnet 204, and the second portion 2312 of the conductor 231 may include a fourth end 2342 that is located a relatively long distance away from the first magnet 204 with respect to coil 1-2 234. Coil 1-2 234 may be formed between the third end 2341 and the fourth end 2342. Depending on the direction of current flowing through coil 1-2 234, an N-pole and an S-pole may be formed at the third end 2341 and the fourth end 2342, or vice versa.

In the illustrated embodiment, the first magnet 204 may be disposed between the first end 2321 of the first portion 2311 of the conductor 231 and the third end 2341 of the second portion 2312 of the conductor 231.

In an embodiment, the first magnet 204 may include magnet 1-1 2041 and magnet 1-2 2042. Magnet 1-1 2041 may be adjacent to the first end 2321 of the conductor 231, and magnet 1-2 2042 may be adjacent to the third end 2341 of the conductor 231. Magnet 1-1 2041 may magnetically interact with coil 1-1 232, and magnet 1-2 2042 may magnetically interact with coil 1-2 234.

In some embodiments, the conductor 231 may include a first area that is located on a side of the area where coil 1-1 232 is formed and that is adjacent to the one side of the first magnet 204 and a second area opposite to the first area with respect to coil 1-1 232. In some embodiments, the conductor 231 may include a third area that is located on a side of the area where coil 1-2 234 is formed and that is adjacent to the opposite side of the first magnet 204 and a fourth area opposite to the third area with respect to coil 1-2 234. In some embodiments, the first magnet 204 may be disposed between the first area of the conductor 231 and the third area of the conductor 231.

In the illustrated embodiment, the aperture blades 210 and 220 may be coupled to the lens carrier 140 so as to maintain a predetermined gap d1 from the lens 144 or the end surface of the lens barrel 142 that faces the optical axis direction of the lens 144. Accordingly, the camera module 100 according to the embodiment is able to adjust the amount of light incident on the lens 144 irrespective of the displacement of the lens carrier 140 in the optical axis direction.

Figure 8A:
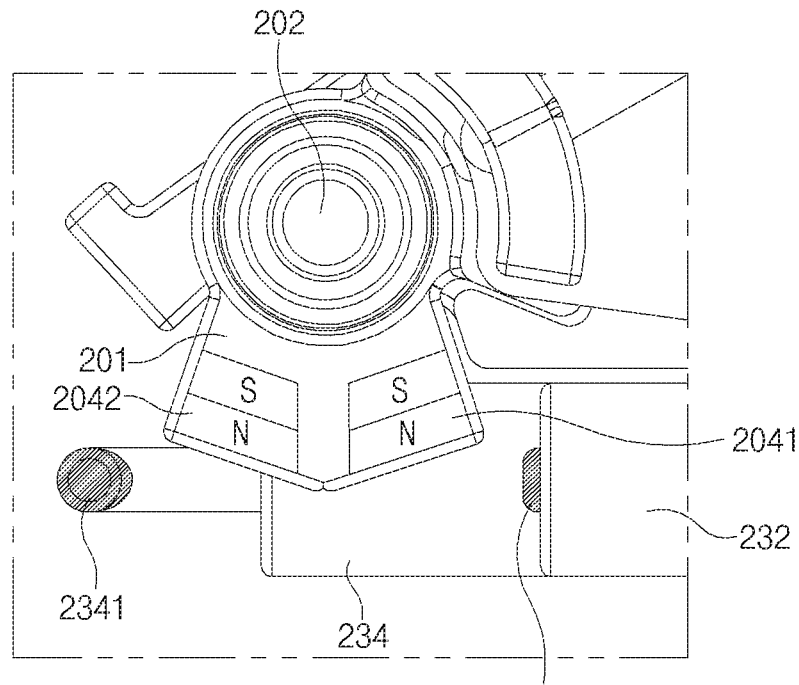
FIGS. 8A and 8B are views illustrating an arrangement of a first magnet of the rotary member of the camera module according to various embodiments of the disclosure.
Figure 8B:
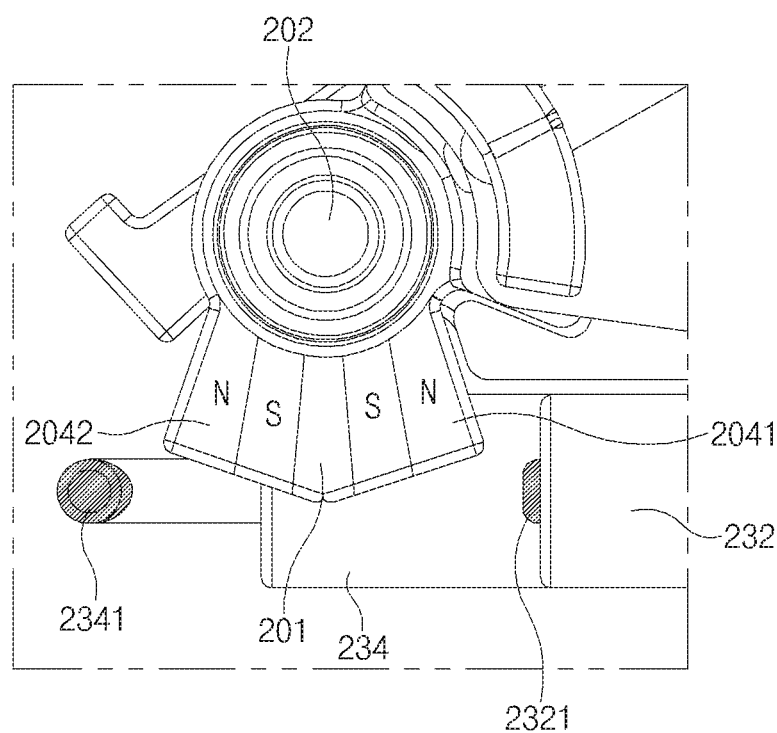

FIGS. 8A and 8B are views illustrating an arrangement of the first magnet 204 of the rotary member 201 of the camera module 100 according to an embodiment of the disclosure.

Referring to FIGS. 8A and 8B, the first magnet 204 may be spaced apart from the rotary shaft 202 by a predetermined distance in the radial direction. The first magnet 204 may be disposed between the first end 2321 and the third end 2341 of the conductor 231. The first magnet 204 may include magnet 1-1 2041 adjacent to the first end 2321 of the conductor 231 and magnet 1-2 2042 adjacent to the third end 2341 of the conductor 231. Magnetic poles (an N pole or an S pole) formed at the first end 2321 and the second end 2322 may be related to the direction of current flowing through coil 1-1 232, and magnetic poles (an N pole or an S pole) formed at the third end 2341 and the fourth end 2342 may be related to the direction of current flowing through coil 1-2 234.

Referring to FIG. 8A, the first magnet 204 may include an N pole forming a surface of the rotary member 201 and an S pole formed in a direction toward the center from the N pole. The N pole and the S pole may be formed in a curved shape. For example, the N pole and the S pole may be formed in a circular arc shape with the rotary shaft 202 as the center when viewed from above.

Referring to FIG. 8B, the first magnet 204 may include an N pole facing the first end 2321 of the conductor 231 and an S pole facing the third end 2341 of the conductor 231. Magnet 1-1 2041 may include the N pole facing the first end 2321 and an S pole formed in a circumferential direction from the N pole. Magnet 1-2 2042 may include the S pole facing the third end 2341 and an N pole formed in a circumferential direction from the S pole. That is, in the embodiment illustrated in FIG. 8B, the N poles and the S poles of the first magnet 204 may be formed in different radial directions.

In the embodiment illustrated in FIG. 8, first control circuitry (e.g., the first control circuitry 233 of FIG. 2) may control coil 1-1 232 and coil 1-2 234 such that a magnetic force generated between the first end 2321 of the conductor 231 and the first magnet 204 is opposite to a magnetic force generated between the third end 2341 and the second magnet 172.

For example, the first control circuitry may control the directions of currents flowing through coil 1-1 232 and coil 1-2 234 such that different magnetic poles are formed at the first end 2321 and the third end 2341.

For example, when coil 1-1 232 and coil 1-2 234 are wound in the same direction, the first control circuitry may perform control such that the direction of current flowing through coil 1-1 232 and the direction of current flowing through coil 1-2 234 differ from each other. Accordingly, an attractive force (or a repulsive force) may be generated between the first end 2321 of the conductor 231 and magnet 1-1 2041, and a repulsive force (or an attractive force) may be generated between the second end 2322 of the conductor 231 and magnet 1-2 2042. In this case, the rotary member 201 to which the first magnet 204 is coupled may rotate about the rotary shaft 202.

In an embodiment, the rotation angle of the rotary member 201 may vary depending on the strengths of the magnetic forces generated between the first magnet 204 and the first and third ends 2321 and 2341 of the conductor 231. Furthermore, the strengths of the magnetic forces may be proportional to the currents flowing through the coils wound around the conductor 231. Accordingly, the first control circuitry may cause currents corresponding to the rotation angle of the rotary member 201 to flow through coil 1-1 232 and coil 1-2 234.

In an embodiment, the first control circuitry may control the direction of current flowing through the first coil 230 such that the first opening 211 of the first aperture blade 210 or the second opening 221 of the second aperture blade 220 is located on the optical axis of the lens 144.

In some embodiments, the first control circuitry may uniformly maintain the amount of current flowing through the first coil 230 and may control only the direction of the current. For example, the first control circuitry may perform control such that the center of the first opening 211 formed in the first aperture blade 210 and the center of the second opening 221 formed in the second aperture blade 220 are accurately located on the optical axis of the lens 144. That is, in the case of the camera module 100 including the two aperture blades 210 and 220, a preferred rotation angle of the aperture blades 210 and 220 may always remain constant, and only the direction of rotation may be varied. The preferred rotation angle may be an internal angle between a vector extending from the rotary shaft 202 to the center of the first opening 211 and a vector extending from the rotary shaft 202 to the center of the second opening 221. The first control circuitry may be configured to cause an amount of current corresponding to the internal angle to flow through the first coil 230 and to control only the direction of the current.

Figure 9:
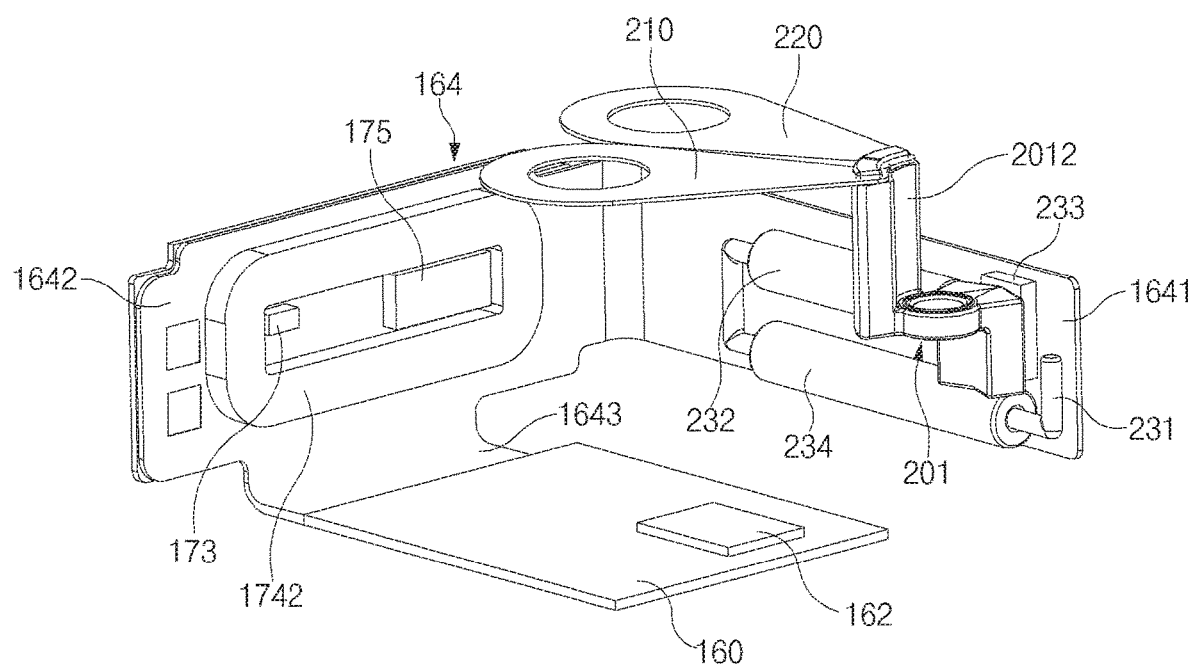
FIG. 9 is a view illustrating control circuitry of the camera module according to an embodiment of the disclosure.

FIG. 9 is a view illustrating the first coil 230, the second coil 174, the first control circuitry 233, the second control circuitry 175, the image sensor 162, and the flexible printed circuit board 164 of the camera module 100 according to an embodiment of the disclosure.

Referring to FIG. 9, in an embodiment, the camera module 100 may include the first control circuitry 233 for controlling the first coil 230 and a first sensor (not illustrated) for sensing the position of the lens carrier 140. The first sensor may be integrated with the first control circuitry 233.

In an embodiment, the first control circuitry 233 may control power applied to the first coil 230. For example, the first control circuitry 233 may adjust the intensity or direction of a magnetic field generated by the first coil 230, by controlling the amount or direction of current flowing through the first coil 230.

In an embodiment, the first sensor may include a Hall sensor that senses a change of a magnetic field generated by the first magnet 204 included in the aperture module 200. The first sensor may be disposed in the housing and may preferably be disposed in a position adjacent to the first magnet 204.

In an embodiment, the first control circuitry 233 may determine the position of the first magnet 204 through the first sensor. Furthermore, the first control circuitry 233 may determine, through the first sensor, the displacement of the lens carrier 140 that moves together with the first magnet 204 in the optical axis direction of the lens 144. For example, the first sensor may be electrically connected with the first control circuitry 233. The first sensor may transmit, to the first control circuitry 233, a signal related to the change of the magnetic field generated by the first magnet 204. Based on the signal, the first control circuitry 233 may determine the displacement of the lens carrier 140, which moves together with the first magnet 204 in the optical axis direction of the lens 144, or the displacement of the first magnet 204.

For example, when the lens carrier 140 moves a predetermined distance in the optical axis direction of the lens 144, the distance between the first sensor fixed to the housing and the first magnet 204 that moves together with the lens carrier 140 may be increased, and therefore the magnetic field generated by the first magnet 204 may be decreased. The first sensor may transmit, to the first control circuitry 233, the signal related to the change of the magnetic field generated by the first magnet 204.

In an embodiment, the first control circuitry 233 may control the first coil 230 based on the distance between the first coil 230 and the first magnet 204. Alternatively, the first control circuitry 233 may control the first coil 230 in view of the relationship between the magnetic field generated by the first coil 230 and the first magnet 204. The first control circuitry 233 may correct a control signal for controlling the first coil 230, based on the signal related to the magnetic field change that is transmitted by the first sensor.

For example, when the lens carrier 140 moves in the optical axis direction of the lens 144 (e.g., a direction in which the first magnet 204 moves away from the first sensor), the distance between the first magnet 204, which moves together with the lens carrier 140, and the first coil 230 fixed to the housing may be increased. At this time, the first control circuitry 233 may correct a first control signal for controlling the first coil 230, based on the increased distance and may control the first coil 230 using the corrected first control signal.

In an embodiment, the first control circuitry 233 may be configured to perform closed-loop control on the first control signal by configuring the signal related to the magnetic field generated by the first magnet 204 as a feedback signal. The magnetic field generated by the first magnet 204 may be sensed by the first sensor. For example, the first control circuitry 233 may correct the first control signal based on the magnitude, the direction, and/or the rate of change of the magnetic field generated by the first magnet 204 and may control the first coil 230 using the corrected first control signal.

In various embodiments, the first control circuitry 233 may be configured to perform closed-loop control on the first control signal by configuring the amount of light incident on the lens 144 as a feedback signal. For example, based on a signal related to the amount of light, the first control circuitry 233 may determine whether the aperture blades 210 and 220 are accurately located on the optical axis of the lens 144 and may correct the first control signal.

In an embodiment, the camera module 100 may include the second control circuitry 175 for controlling the second coil 174 and the second sensor 173 for sensing the position of the lens carrier 140. The second control circuitry 175 may be integrated with the first control circuitry 233.

In an embodiment, the camera module 100 may include the flexible printed circuit board 164 that covers at least part of the sidewall 134 of the lower housing 130. The flexible printed circuit board 164 may include the first area 1641 disposed on the sidewall 134 of the lower housing 130 on which the first coil 230 is disposed, the second area 1642 disposed on the sidewall 134 of the lower housing 130 on which the second coil 174 is disposed, and the third area 1643 connected with the substrate 160 including the image sensor 162.

In some embodiments, the first control circuitry 233 and the second control circuitry 175 may be disposed on the substrate 160.

In an embodiment, the first area 1641 of the flexible printed circuit board 164 may include a conductive pattern for connecting the first coil 230, the first control circuitry 233, and the first sensor. The second area 1642 of the flexible printed circuit board 164 may include a conductive pattern for connecting the second coil 174, the second control circuitry 175, and the second sensor 173.

Figure 10A:
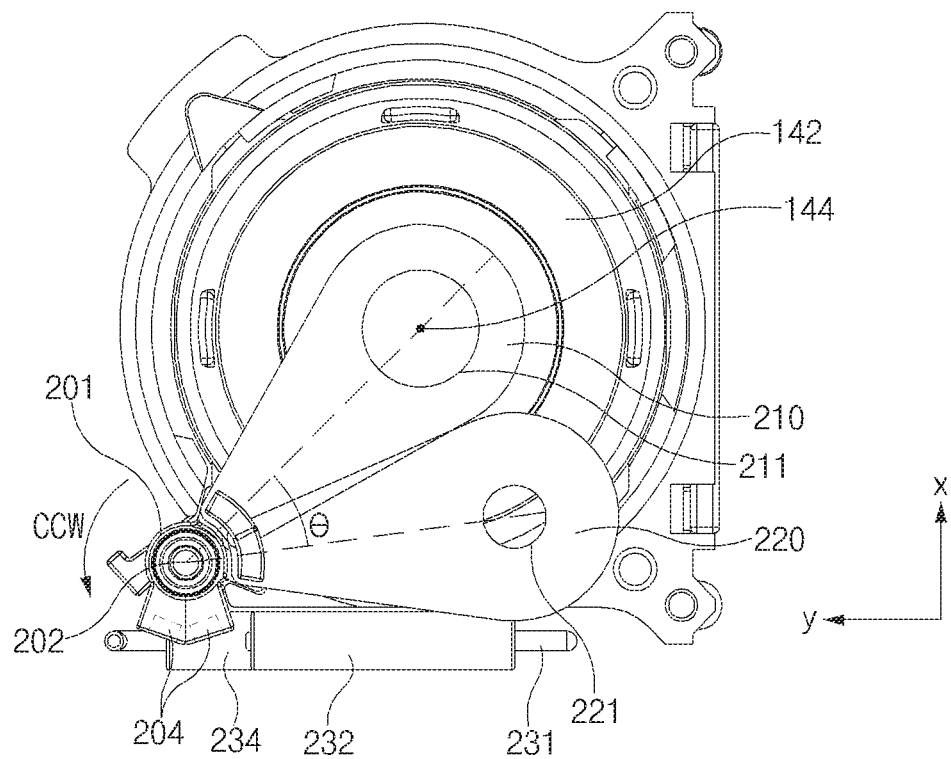
FIGS. 10A and 10B are views illustrating operations of aperture blades of the camera module according to various embodiments of the disclosure.
Figure 10B:
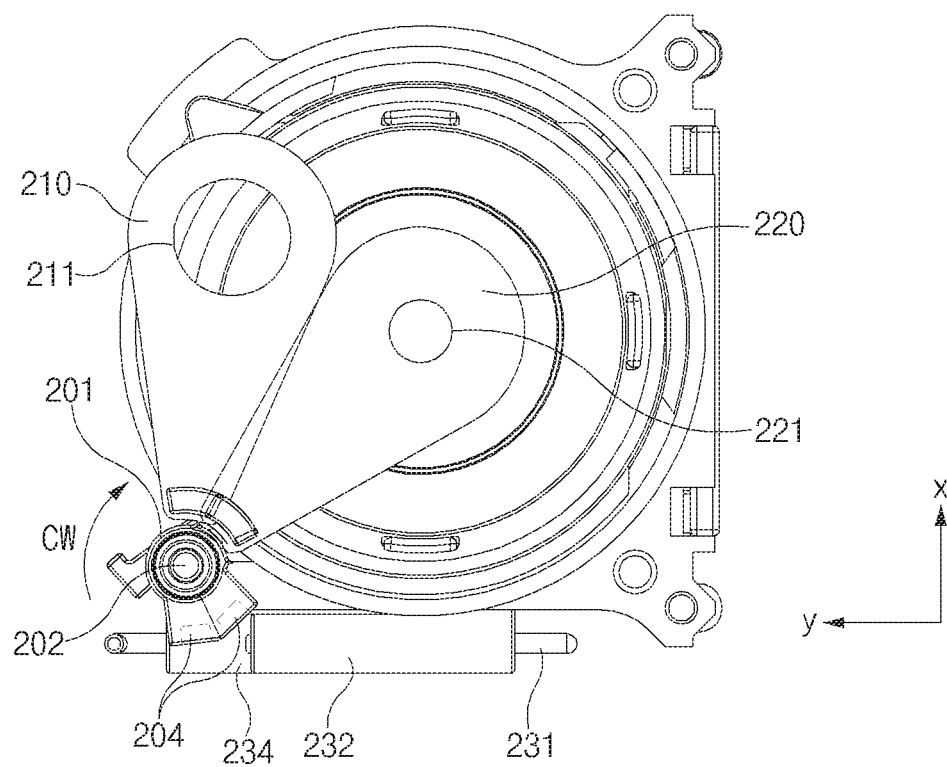

FIGS. 10A and 10B are views illustrating operations of the aperture blades 210 and 220 of the camera module 100 according to an embodiment of the disclosure.

In an embodiment, the camera module 100 may adjust the amount of light incident on the lens 144 disposed in the lens barrel 142, by rotating the first aperture blade 210 and the second aperture blade 220.

Referring to FIGS. 10A and 10B, in an embodiment, the camera module 100 may include a first state, illustrated in FIG. 10A, in which the first opening 211 formed in the first aperture blade 210 is located on the optical axis of the lens 144 and a second state, illustrated in FIG. 10B, in which the second opening 221 formed in the second aperture blade 220 is located on the optical axis of the lens 144. The second opening 221 may be formed to be smaller than the first opening 211. When the second opening 221 is located on the optical axis of the lens 144, the amount of light incident on the lens 144 may be less than that when the first opening 211 is located on the optical axis of the lens 144.

In some embodiments, the lens barrel 142 may include the fixed opening aligned with the optical axis of the lens 144 disposed in the lens barrel 142. Light may be incident on the lens 144 in the lens barrel 142 through the fixed opening. The camera module 100 may include one or more aperture blades (e.g., the aperture blade 210 or 220) that have the opening 211 or 221 formed to be smaller than the fixed opening. In the embodiment, to reduce the amount of incident light, the aperture blades of the camera module 100 may be rotated to align a relatively small opening formed in the aperture blades with the optical axis of the lens 144.

The second state, illustrated in FIG. 10B, may be obtained by rotating the rotary member 201 about the rotary shaft 202 through a first angle θ in the counterclockwise direction in the first state, illustrated in FIG. 10A. Likewise, the first state illustrated in FIG. 10A may be obtained by rotating the rotary member 201 about the rotary shaft 202 through the first angle θ in the clockwise direction in the second state illustrated in FIG. 10B. The first angle θ may be an internal angle between a first vector extending from the rotary shaft 202 to the center of the first opening 211 and a second vector extending from the rotary shaft 202 to the center of the second opening 221.

In an embodiment, the camera module 100 may be configured such that in a relatively dark place, the second opening 221 of the second aperture blade 220 is located on the optical axis of the lens 144 and in a relatively bright place, the first opening 211 of the first aperture blade 210 is located on the optical axis of the lens 144.

Figure 11:
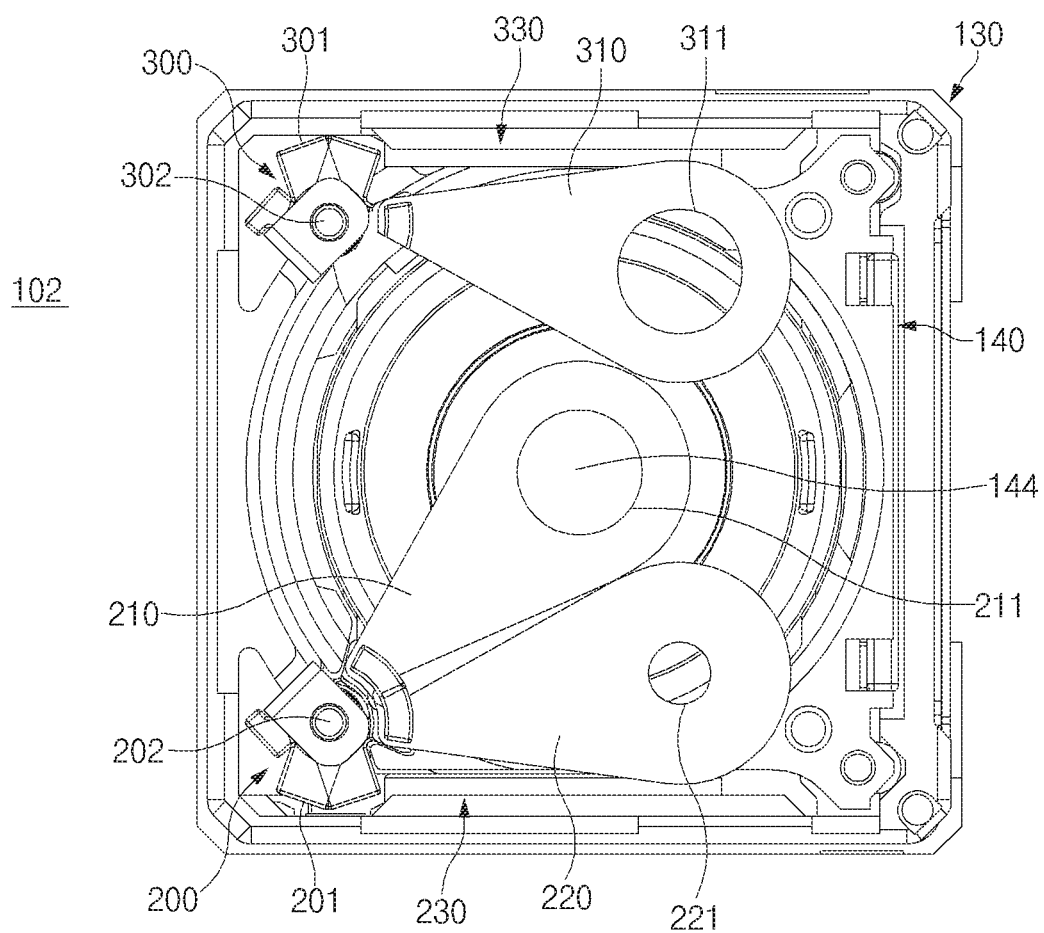
FIG. 11 is a plan view of a camera module according to an embodiment of the disclosure.

FIG. 11 is a plan view of a camera module 102 according to an embodiment of the disclosure. In FIG. 11, the upper housing 120 and the cover 110 are omitted and the lens carrier 140 and the lower housing 130 are only illustrated.

Referring to FIG. 11, the camera module 100 may include the first aperture module 200 and a second aperture module 300. As described above, the first aperture module 200 may include the first aperture blade 210 having the first opening 211 formed therein, the second aperture blade 220 having the second opening 221 formed therein, the first rotary member 201 to which the first aperture blade 210 and the second aperture blade 220 are connected and that rotates about the first rotary shaft 202, the magnet disposed in the rotary member 201, and the first coil 230.

According to the illustrated embodiment, the camera module 102 may further include the second aperture module 300. The second aperture module 300 may include a third aperture blade 310 having a third opening 311 formed therein, a second rotary member 301 to which the third aperture blade 310 is connected and that rotates about a second rotary shaft 302, a magnet disposed in the rotary member 301, and a third coil 330. The first opening 211, the second opening 221, and the third opening 311 may have different diameters.

The components of the second aperture module 300 are identical to the components of the first aperture module 200 described above with reference to FIGS. 1 to 10, and therefore descriptions thereabout will be omitted.

In the illustrated embodiment, the first aperture blade 210 and the second aperture blade 220 may be configured to rotate on a first plane about the first rotary shaft 202. The first plane may be a virtual plane spaced apart from the lens 144 or the end surface of the lens barrel 142 that faces the optical axis direction of the lens 144, by a predetermined gap (e.g., dl in FIG. 7) in the optical axis direction of the lens 144. Meanwhile, the third aperture blade 310 may be configured to rotate on a second plane different from the first plane about the second rotary shaft 302.

Figure 12:
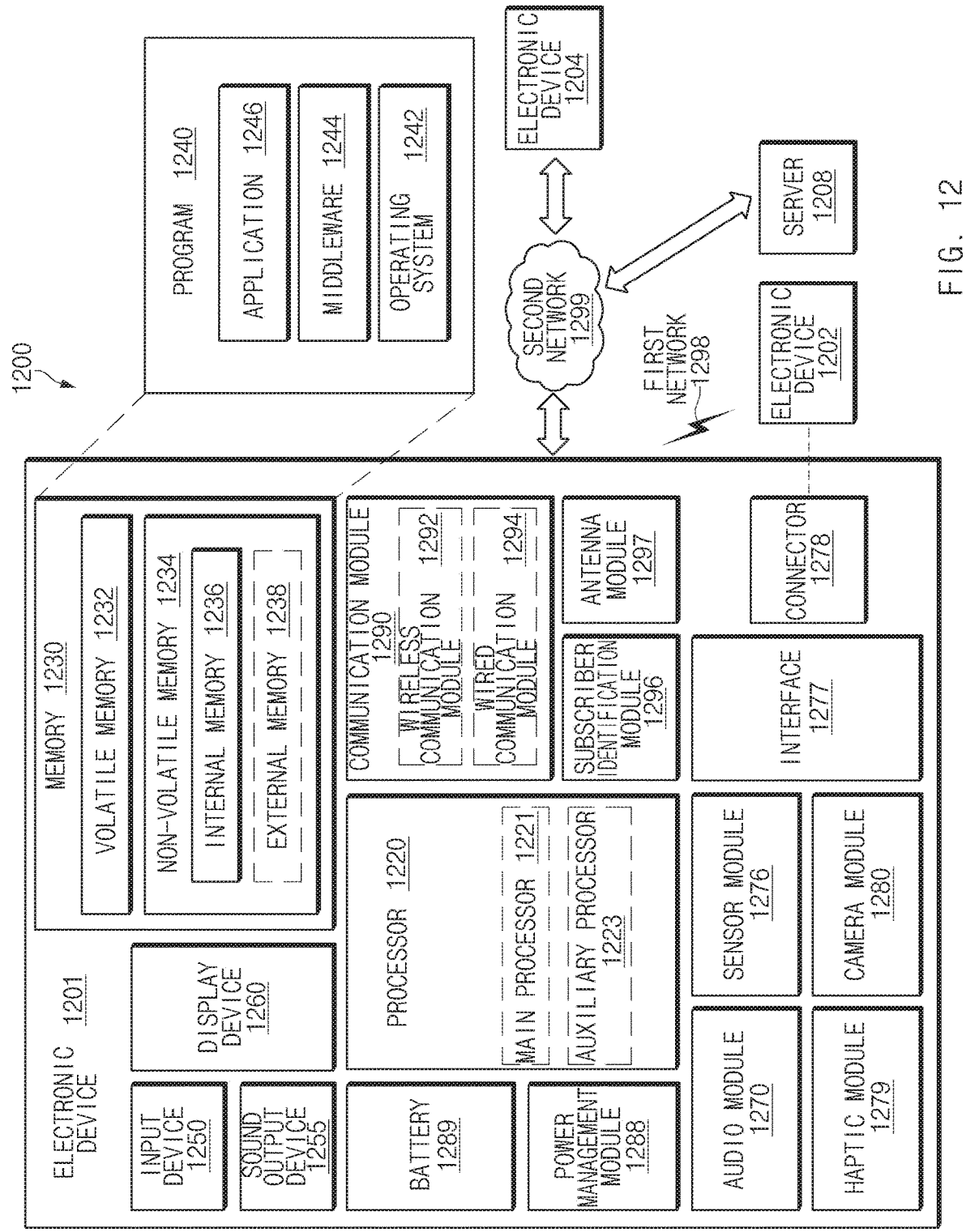
FIG. 12 is a block diagram illustrating an electronic device in a network environment according to an embodiment of the disclosure.

FIG. 12 is a block diagram illustrating an electronic device 1201 in a network environment 1200 according to an embodiment.

Referring to FIG. 12, the electronic device 1201 in the network environment 1200 may communicate with an electronic device 1202 via a first network 1298 (e.g., a short-range wireless communication network), or an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module (SIM) 1296, or an antenna module 1297. In some embodiments, at least one (e.g., the display device 1260 or the camera module 1280) of the components may be omitted from the electronic device 1201, or one or more other components may be added in the electronic device 1201. In some embodiments, some of the components may be implemented as single integrated circuitry. For example, the sensor module 1276 (e.g., a fingerprint sensor, an iris sensor, or an illuminance sensor) may be implemented as embedded in the display device 1260 (e.g., a display).

The processor 1220 may execute, for example, software (e.g., a program 1240) to control at least one other component (e.g., a hardware or software component) of the electronic device 1201 coupled with the processor 1220, and may perform various data processing or computation.

According to one embodiment, as at least part of the data processing or computation, the processor 1220 may load a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), and an auxiliary processor 1223 (e.g., a graphics processing unit (GPU), an image signal processor (ISP), a sensor hub processor, or a communication processor (CP)) that is operable independently from, or in conjunction with, the main processor 1221. Additionally or alternatively, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display device 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input device 1250 may receive a command or data to be used by another component (e.g., the processor 1220) of the electronic device 1201, from the outside (e.g., a user) of the electronic device 1201. The input device 1250 may include, for example, a microphone, a mouse, a keyboard, or a digital pen (e.g., a stylus pen).

The sound output device 1255 may output sound signals to the outside of the electronic device 1201. The sound output device 1255 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 1260 may visually provide information to the outside (e.g., a user) of the electronic device 1201. The display device 1260 may include, for example, a display, a hologram device, or a projector and control circuitry to control a corresponding one of the display, hologram device, and projector. According to an embodiment, the display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. According to an embodiment, the audio module 1270 may obtain the sound via the input device 1250, or output the sound via the sound output device 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal or connector 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to one embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™ wireless-fidelity (Wi-Fi) direct, or infrared data association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 1201. According to an embodiment, the antenna module 1297 may include an antenna including a radiating element composed of a conductive material or a conductive pattern formed in or on a substrate (e.g., PCB). According to an embodiment, the antenna module 1297 may include a plurality of antennas. In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

Figure 13:
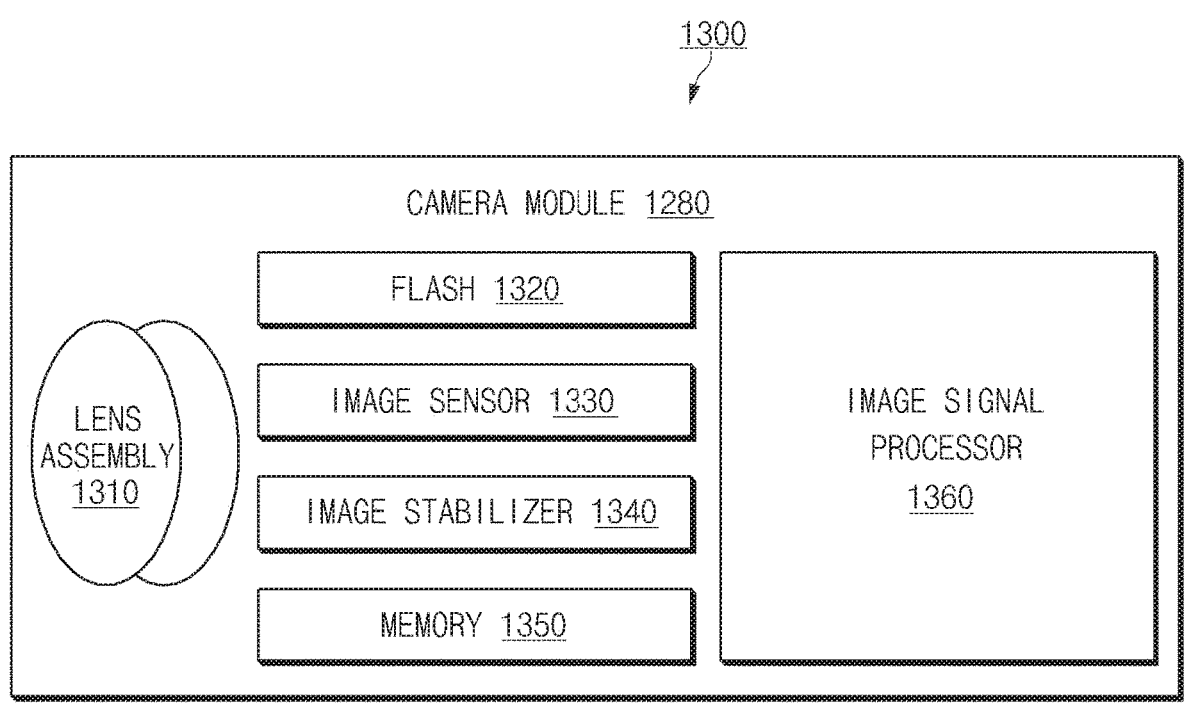
FIG. 13 is a block diagram illustrating a camera module according to an embodiment of the disclosure.

FIG. 13 is a block diagram 1300 illustrating the camera module 1280 according to an embodiment of the disclosure.

Referring to FIG. 13, the camera module 1280 may include a lens assembly 1310, a flash 1320, an image sensor 1330, an image stabilizer 1340, memory 1350 (e.g., buffer memory), or an image signal processor 1360. The lens assembly 1310 may collect light emitted or reflected from an object whose image is to be taken. The lens assembly 1310 may include one or more lenses. According to an embodiment, the camera module 1280 may include a plurality of lens assemblies 1310. In such a case, the camera module 1280 may form, for example, a dual camera, a 360-degree camera, or a spherical camera. Some of the plurality of lens assemblies 1310 may have the same lens attribute (e.g., view angle, focal length, auto-focusing, f number, or optical zoom), or at least one lens assembly may have one or more lens attributes different from those of another lens assembly. The lens assembly 1310 may include, for example, a wide-angle lens or a telephoto lens.

The flash 1320 may emit light that is used to reinforce light reflected from an object. According to an embodiment, the flash 1320 may include one or more light emitting diodes (LEDs) (e.g., a red-green-blue (RGB) LED, a white LED, an infrared (IR) LED, or an ultraviolet (UV) LED) or a xenon lamp. The image sensor 1330 may obtain an image corresponding to an object by converting light emitted or reflected from the object and transmitted via the lens assembly 1310 into an electrical signal. According to an embodiment, the image sensor 1330 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 1330 may be implemented using, for example, a charged coupled device (CCD) sensor or a complementary metal oxide semiconductor (CMOS) sensor.

The image stabilizer 1340 may move the image sensor 1330 or at least one lens included in the lens assembly 1310 in a particular direction, or control an operational attribute (e.g., adjust the read-out timing) of the image sensor 1330 in response to the movement of the camera module 1280 or the electronic device 1201 including the camera module 1280. This allows compensating for at least part of a negative effect (e.g., image blurring) by the movement on an image being captured. According to an embodiment, the image stabilizer 1340 may sense such a movement by the camera module 1280 or the electronic device 1201 using a gyro sensor (not shown) or an acceleration sensor (not shown) disposed inside or outside the camera module 1280. According to an embodiment, the image stabilizer 1340 may be implemented, for example, as an optical image stabilizer.

The memory 1350 may store, at least temporarily, at least part of an image obtained via the image sensor 1330 for a subsequent image processing task. For example, if image capturing is delayed due to shutter lag or multiple images are quickly captured, a raw image obtained (e.g., a Bayer-patterned image, a high-resolution image) may be stored in the memory 1350, and its corresponding copy image (e.g., a low-resolution image) may be previewed via the display device 1260. Thereafter, if a specified condition is met (e.g., by a user's input or system command), at least part of the raw image stored in the memory 1350 may be obtained and processed, for example, by the image signal processor 1360. According to an embodiment, the memory 1350 may be configured as at least part of the memory 1230 or as a separate memory that is operated independently from the memory 1230.

The image signal processor 1360 may perform one or more image processing with respect to an image obtained via the image sensor 1330 or an image stored in the memory 1350. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1360 may perform control (e.g., exposure time control or read-out timing control) with respect to at least one (e.g., the image sensor 1330) of the components included in the camera module 1280. An image processed by the image signal processor 1360 may be stored back in the memory 1350 for further processing, or may be provided to an external component (e.g., the memory 1230, the display device 1260, the electronic device 1202, the electronic device 1204, or the server 1208) outside the camera module 1280. According to an embodiment, the image signal processor 1360 may be configured as at least part of the processor 1220, or as a separate processor that is operated independently from the processor 1220. If the image signal processor 1360 is configured as a separate processor from the processor 1220, at least one image processed by the image signal processor 1360 may be displayed, by the processor 1220, via the display device 1260 as it is or after being further processed.

According to an embodiment, the electronic device 1201 may include a plurality of camera modules 1280 having different attributes or functions. In such a case, at least one of the plurality of camera modules 1280 may form, for example, a wide-angle camera and at least another of the plurality of camera modules 1280 may form a telephoto camera. Similarly, at least one of the plurality of camera modules 1280 may form, for example, a front camera and at least another of the plurality of camera modules 1280 may form a rear camera.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the various embodiments, the disclosure may provide a camera module having various photographing modes or photographing functions by disposing an aperture module while minimizing an increase in the thickness of an electronic device.

According to the various embodiments, the disclosure may provide a camera module in which the gap between an aperture and a lens remains constant even when a lens carrier moves for a focus function.

In addition, the disclosure may provide various effects that are directly or indirectly recognized.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A camera module comprising:
a housing;
a lens assembly received in the housing, the lens assembly including at least one lens;
an aperture including:
   an aperture blade having a first opening of a first size and a second opening of a second size, different from the first size, for adjusting an amount of external light incident on the at least one lens, and
   a rotary shaft formed on a side of the aperture blade, the rotary shaft being coupled to the lens assembly such that the aperture blade is rotatable about the rotary shaft;
a magnet disposed on the aperture to be adjacent to the rotary shaft;
at least one coil disposed on one surface of the housing so as to face the magnet;
control circuitry configured to rotate the aperture using the coil; and
a lens driving unit configured to move the lens assembly in an optical axis direction of the lens.

2. The camera module of claim 1, wherein the rotary shaft is formed parallel to the optical axis direction of the lens.

3. The camera module of claim 1,
wherein the lens assembly includes a lens barrel in which the at least one lens is disposed,
wherein the camera module further comprises a fixed opening aligned with the optical axis direction of the lens formed in the lens barrel, and
wherein the fixed opening is formed to be larger than the opening formed in the aperture blade.

4. The camera module of claim 1,
wherein the aperture blade comprises:
   a first aperture blade having the first opening formed therein, and
   a second aperture blade having the second opening formed therein,
and
wherein the first aperture blade and the second aperture blade extend in different radial directions with respect to the rotary shaft.

5. The camera module of claim 4,
wherein the first aperture blade and the second aperture blade are formed on the same plane, or
wherein the first aperture blade is formed on a first plane, and the second aperture blade is formed on a second plane spaced apart from the first plane by a predetermined gap in the optical axis direction of the lens.

6. The camera module of claim 1, wherein the aperture blade maintains a predetermined gap from the at least one lens included in the lens assembly in the optical axis direction of the lens.

7. The camera module of claim 1,
wherein the camera module further comprises a sensor disposed on one surface of the housing and configured to sense a rotation angle of the aperture blade, and
wherein the control circuitry is further configured to:
   rotate the aperture blade by applying current to the coil adjacent to the magnet, and
   rotate the aperture blade to a specified rotation angle by correcting the current applied to the coil, based on the rotation angle sensed by the sensor.

8. The camera module of claim 1, further comprising:
a sensor disposed on one surface of the housing and configured to sense a magnetic force of the magnet,
wherein the control circuitry is further configured to:
   determine a position of the lens assembly in the optical axis direction of the lens, based on the magnetic force of the magnet sensed by the sensor,
   correct a signal for controlling the coil, based on the position of the lens assembly, and
   apply a control signal to the coil depending on the corrected signal.

9. The camera module of claim 1,
wherein the lens assembly includes a central portion in which the at least one lens is disposed and a peripheral portion surrounding the central portion,
wherein the aperture includes the aperture blade, the magnet, and a rotary body formed to be rotatable about the rotary shaft relative to the lens assembly,
wherein a protruding boss protruding in the optical axis direction of the lens is formed on one of the peripheral portion and the rotary body, and a hole into which the protruding boss is inserted is formed in the other one of the peripheral portion and the rotary body, and
wherein the protruding boss is rotatably coupled to the hole to form the rotary shaft.

10. The camera module of claim 1,
wherein the magnet is disposed in a direction toward the one surface of the housing with respect to the rotary shaft, and
wherein the aperture blade extends toward a central portion of the lens assembly with respect to the rotary shaft.

11. A camera module comprising:
a housing;
a lens carrier including a lens barrel including one or more lenses therein, at least part of the lens carrier being disposed in the housing, and the lens carrier being movable in an optical axis direction of the one or more lenses;
an aperture module configured to adjust an amount of light incident on the one or more lenses; and
control circuitry configured to control the aperture module,
wherein the aperture module includes:
   a rotary member coupled to the lens carrier so as to be rotatable about a rotary shaft formed in the lens carrier, an aperture blade extending from the rotary member toward the lens barrel and having a first opening of a first size and a second opening of a second size, different from the first size,
a first coil formed on a first surface of the housing, and
a first magnet formed in the rotary member and disposed adjacent to the first coil, and
wherein the control circuitry controls the first coil to rotate the rotary member and the aperture blade about the rotary shaft to align either the first opening or the second opening with an optical axis of the lenses.

12. The camera module of claim 11,
wherein the first coil includes a conductor and a conductive wire wound around the conductor,
wherein the conductor extends toward the first magnet,
wherein the first coil includes a first sub-coil and a second sub-coil,
wherein the conductor includes a first portion on which the first sub-coil is formed and a second portion on which the second sub-coil is formed,
wherein the first portion of the conductor extends toward one side of the first magnet such that an end of the first portion is adjacent to the one side of the first magnet, and
wherein the second portion of the conductor extends toward an opposite side of the first magnet such that an end of the second portion is adjacent to the opposite side of the first magnet.

13. The camera module of claim 11, further comprising:
a focus module configured to move the lens carrier in the optical axis direction of the lenses,
wherein the focus module includes a second magnet formed on an outer surface of the lens carrier and a second coil formed on a second surface of the housing to face the second magnet, and
wherein the control circuitry controls the second coil to move the lens carrier in the optical axis direction of the lenses.

14. The camera module of claim 13,
wherein the first surface of the housing on which the first coil is disposed is connected with the second surface of the housing on which the second coil is disposed, and
wherein the camera module further comprises a flexible printed circuit board disposed on the first surface and the second surface to electrically connect the first coil, the second coil, and the control circuitry.

15. The camera module of claim 11, further comprising:
a sensor configured to sense displacement of the lens carrier in the optical axis direction of the lenses, the sensor being disposed in the housing,
wherein the control circuitry is configured to correct a control signal for controlling the first coil, based on the displacement of the lens carrier sensed by the sensor.

16. The camera module of claim 11,
further comprising a first aperture blade having the first opening formed therein and a second aperture blade having the second opening formed therein,
wherein the first aperture blade and the second aperture blade are configured to rotate about the rotary shaft on the same plane, and
wherein the same plane is spaced a predetermined gap apart from the one or more lenses or an end surface of the lens barrel that faces the optical axis direction of the lenses.

17. An electronic device comprising:
a camera module including:
a housing,
a lens carrier including one or more lenses therein, at least part of the lens carrier being disposed in the housing and the lens carrier being movable in an optical axis direction of the one or more lenses,
a rotary member coupled to the lens carrier so as to be rotatable about a rotary shaft formed in the lens carrier,
an aperture blade extending from the rotary member toward the lenses and having a first opening of a first size and a second opening of a second size, different from the first size,
a first coil formed on a first surface of the housing, and
a first magnet formed in the rotary member and disposed adjacent to the first coil;
a memory; and
at least one processor electrically connected with the memory and the camera module,
wherein the at least one processor is configured to:
activate the camera module in response to a request associated with taking an image, and
drive the aperture blade of the camera module to align either the first opening or the second opening with an optical axis of the lenses according to aperture settings associated with taking the image.

18. The electronic device of claim 17, further comprising:
an image sensor to obtain an image corresponding to an object by converting light emitted or reflected from the object and transmitted via the lens carrier into an electrical signal.

19. The electronic device of claim 18, further comprising:
an image stabilizer,
wherein the at least one processor is further configured to, at least one of:
control movement of the image sensor,
control movement of at least one lens, among the one or more lenses included in the lens carrier, in a particular direction, or
control an operational attribute of the image sensor in response to the movement of the camera module.

20. The electronic device of claim 18, further comprising:
a memory to store at least part of the image obtained via the image sensor for image processing.

* * * * *